United States Patent
Howard et al.

(10) Patent No.: US 6,529,513 B1
(45) Date of Patent: Mar. 4, 2003

(54) METHOD OF USING STATIC MAPS IN A VIRTUAL PRIVATE NETWORK

(75) Inventors: Brett Howard, Nepean (CA); Andrew Robison, Ottawa (CA); Roy Pereira, Ottawa (CA); Paul Kierstead, Ottawa (CA); Gabor Solymar, Stittsville (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/244,204

(22) Filed: Feb. 4, 1999

(30) Foreign Application Priority Data

Feb. 4, 1998 (CA) .............................. 2228687

(51) Int. Cl.⁷ .................................. H04J 3/02
(52) U.S. Cl. ................ 370/401; 370/395.52; 370/911; 379/93.02; 709/225; 709/226; 709/227; 713/701
(58) Field of Search ................ 370/352, 353, 370/354, 400, 401, 402, 395.5, 395.51, 395.52, 911; 379/91.01, 91.02, 93.02, 93.03; 709/226, 227, 228, 229, 225; 713/200, 201, 202

(56) References Cited

U.S. PATENT DOCUMENTS

| | | | | |
|---|---|---|---|---|
| 6,055,575 A | * | 4/2000 | Paulsen et al. | |
| 6,058,250 A | * | 5/2000 | Harwood et al. | |
| 6,154,843 A | * | 11/2000 | Hart, Jr. et al. | |
| 6,226,748 B1 | * | 5/2001 | Bots et al. | |
| 6,289,010 B1 | * | 9/2001 | Voit et al. | |

\* cited by examiner

*Primary Examiner*—Dang Ton
*Assistant Examiner*—Shick Hom
(74) *Attorney, Agent, or Firm*—Blake, Cassels & Graydon LLP; Alfred A. Macchione (57) ABSTRACT

A method and system for providing routing information for use in virtual private networks is disclosed. The method supports a variety of different secure network topologies. According to the method a static map is generated including information on each static gateway and resources accessible therethrough. The map also contains security information for accessing and authenticating a gateway.

25 Claims, 6 Drawing Sheets

METHOD OF USING STATIC MAPS IN A VIRTUAL PRIVATE NETWORK

FIELD OF THE INVENTION

This invention relates generally to communications networks and more particular to a virtual private network (VPN).

BACKGROUND OF THE INVENTION

Computer security is fast becoming an important issue. With the proliferation of computers and computer networks into all aspects of business and daily life—financial, medical, education, government, and communications—the concern over secure file access is growing. One method of providing security from unauthorized access to files is by implementing encryption and cipher techniques. These techniques convert data into other corresponding data forms in a fashion that is reversible. Once encrypted, the data is unintelligible unless first decrypted. DES, triple-DES and CAST are known encryption techniques that are currently believed to provide sufficient security for computer communications and files.

Historically, secure networks were achieved by preventing access to data within the network by those outside the network. Networks were formed of a number of computers interconnected by cables. No access to the network was permitted save through the use of one of the interconnected computers. In order to use these computers, it was necessary to be physically located within a building housing the network.

With the proliferation of modems, it became clear that remote access is a powerful tool. In order to provide remote access to network data, dial-up servers were maintained in communication with a public communication network such as a phone network. An individual wishing access to the network, connects to the dial-up server with a computer equipped with a modem or another appropriate communication device, logs into the network, and is then provided access to the network. In this fashion, network data is only communicated over communication channels within the physical network and over dedicated dial-up connections. This was commonly viewed as less secure than the physically isolated computer network, but due to its advantages became commonplace.

With the proliferation of the Internet and Internet-based communications, a need has arisen to provide secure communications via an unsecured public network. Encryption is commonly used to provide this security. For example, PGP (pretty good privacy) is an available encryption software product which implements a private-public key encryption system. Files are encrypted prior to transmission and then decrypted upon reception. The communicated file is secured by the encryption and is as secure as the encryption process used. For occasional file transfers, PGP and similar software products are excellent. Unfortunately, they are not well suited to network access via the public network.

In order to provide SVPNs, IPSEC (Internet Protocol Security) protocol suite was developed. IPSEC is a set of industry-standard extensions to the Internet Protocol (IP) that add security services. The suite contains protocols for an authentication header (AH) assuring data integrity, an encapsulating security payload (ESP) format ensuring data privacy, and a key management and exchange system (IKE). These industry-standard protocols allow for development and implementation of SVPNs.

Unfortunately, many commonly available network features are not available using these protocols alone. Also, flexibility is often compromised to ensure security. It would be advantageous to provide a high degree of flexibility, a broad range of network features, and a high level of security.

OBJECT OF THE INVENTION

It is an object of this invention to provide an SVPN having increased flexibility and increased features over those currently available using the IPSEC protocol suite. In particular it is an object of the invention to provide a method of managing routing and resource availability using pseudo-static information.

In a first aspect, a method of transmitting first data within a secure virtual private network is provided. The method includes the step of storing static map data, the static map data being indicative of static gateways and of resources accessible therethrough, the static map data also including security information for use in authenticating each of the static gateways. The method also includes the step of selecting a resource to which to direct the first data; determining from the static map data a gateway for accessing the selected resource. The method further includes the step of establishing a communication with the determined gateway where certification data is obtained from the determined gateway for use in authenticating the determined gateway. The method further includes the step of authenticating the determined gateway based on the certification data and the security information from the static map data for the determined gateway. The method further includes the step of transmitting the first data to the determined gateway for provision to the selected resource.

The step of storing the static map data may be performed automatically.

The method may further include the step of updating the stored static map data.

The security information of the static map data may further include gateway authentication data.

The static map data may further include gateway forwarding data for accessing the plurality of static gateways.

The static map data may further include resource forwarding data for accessing the resources accessible through the plurality of static gateways.

The step of storing the static map data may further include storing the static map data on a workstation remote to the static gateways for which gateway authentication data and gateway forwarding data is stored within the static map data.

The static map data may further include gateway communication data being indicative of a manner of communicating securely with each of the static gateways The gateway communication data for the static gateways may include data indicative of whether each of the plurality of static gateways supports tunneling.

The static map data may further include gateway security and communication data for the plurality of static gateways. The gateway security and communication data may be indicative of a security access procedure for accessing the plurality of static gateways securely and a manner of communicating securely with each of the plurality of static gateways. The communication established in the step of establishing the communication with the determined gateway and authenticating the determined gateway may be a secure communication and of a type indicated by the gateway security data and gateway communication data and secured in accordance therewith.

In a second aspect, a method of transmitting first data within a secure virtual private network is provided. The method includes the step of storing static map data, the static map data indicative of at least one static gateway, each static gateway having at least one resource accessible therethrough, the static map data being indicative of every resource accessible through each static gateway and comprising security information for use in authenticating each static gateway, the static map data being stored on a workstation remote from each static gateway. The method also includes the step of selecting a destination resource from a set consisting of every resource accessible through each static gateway, the first data for provisioning to the selected destination resource from the workstation. The method further includes the step of selecting from the stored static map data one static gateway through which to access the selected destination resource. The method further includes the step of establishing a communication between the workstation and the selected static gateway and authenticating the selected static gateway. The method further includes the step of transmitting the first data to the selected static gateway for provisioning to the selected destination resource.

In a third aspect, a method of routing first data within a secure virtual private network is provided. The method includes the step of storing a static map, the static map comprising gateway data related to at least one gateway and resource data related to at least one resource, the gateway data including gateway routing data, gateway connection data, gateway security data, and gateway authentication data, the resource data including resource routing data, each resource having a related gateway through which the resource is accessible. The method also includes the step of storing the static map on a workstation remote to each gateway for which gateway data is stored in the static map. The method further includes the step of selecting a destination gateway or destination resource to which to direct the first data. The method further includes the step of, if the destination resource is selected, determining from the static map data the gateway data for the related gateway to the destination resource, the related gateway constituting a routing gateway. The method further includes the step of, if the destination gateway is selected, determining from the static map data the gateway data for said destination gateway, the destination gateway constituting a routing gateway. The method further includes the step of establishing a secure communication with the routing gateway using the gateway routing data and the gateway communication data for the routing gateway, receiving certification data from the routing gateway and authenticating the routing gateway with which the communication is established using the gateway data for the routing gateway. The method further includes the step of transmitting the first data to the routing gateway and, if the destination resource is selected, routing the first data to the destination resource using the resource routing data.

In a fourth aspect, a method of transmitting message data within a network architecture that comprises an originating terminal from which to transmit said message data, a destination network and an intermediate network operatively connected therebetween is provided. The destination network includes at least one gateway for interfacing with the intermediate network, each gateway of the destination network corresponding to at least one resource of the destination network accessible therethrough. The method includes the step of storing static map data, the static map data being indicative of each gateway of the destination network and of each resource of the destination network accessible therethrough, the static map data further including security information for authenticating each gateway of the destination network. The method also includes the step of selecting a resource of the destination network to which to transmit the message data from the originating terminal. The method further includes the step of selecting from the static map data a gateway of the destination network, the selected resource being accessible from the selected gateway. The method further includes the step of establishing a communication with the selected gateway, where certification data is obtained from the selected gateway for use in authenticating the selected gateway. The method further includes the step of authenticating the selected gateway based on the certification data so obtained and on the security information stored in the static map. The method further includes the step of transmitting the message data from the originating terminal to the selected gateway for provision to the selected resource.

BRIEF DESCRIPTION OF THE DRAWINGS

An exemplary embodiment of the invention will now be discussed in conjunction with the attached drawings in which.

DETAILED DESCRIPTION

Commonly when a user logs into a network, the user is provided access to the network according to established rules. For users physically located within a secure environment, these access restrictions prevent dissemination of sensitive information. For example, access to human resource data is often restricted. For users physically located outside the secure environment, these access restrictions prevent hacking—illegal access—from presenting a significant threat to data integrity and security.

Figure 1:
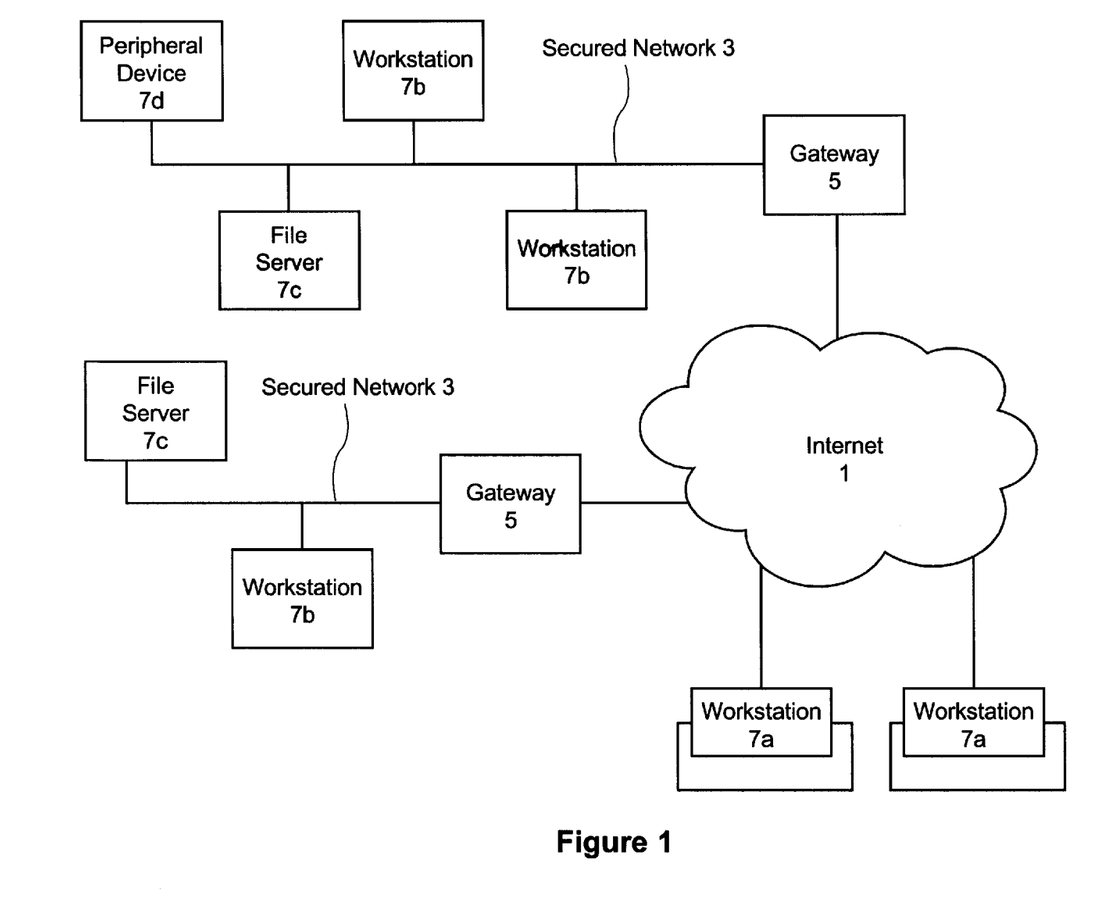
FIG. 1 is a simplified schematic diagram of an SVPN.

Referring to FIG. 1, a secured virtual private network (SVPN) is shown. An unsecured communication medium 1 in the form of the Internet forms a communication backbone for the network and allows for communication between different geographical locations. In communication with the unsecured communication medium 1 are a variety of unsecured and secured systems (not shown). The VPN operates across this communication medium providing communication through the medium 1 and transparent network operations. A secured VPN, an SVPN uses data obfuscation such as encryption to secure data communicated via an unsecured network. A secured network 3 us separated from the unsecured communication medium 1 by a gateway 5. The gateway 5 acts to secure communications with other gateways and with workstations 7a provided with appropriate software. Workstations 7b located within secured networks 3 communicate with the secured network 3 absent gateway security since they lie within the secure private network. Of course, when communication is with a workstation or resource outside the sub-network to which the workstations 7b are connected, then gateway security is required. The secured network 3 also comprises a file server 7c and peripheral devices 7d.

Often, a VPN comprises several sub-networks each located remotely one from another. VPNs are often provided with management systems. In order to maintain a complex secured virtual private network comprising a plurality of sub-networks, information relating to each sub-network is required. The information is then used to determine routing for messages and for data. For example, a security gateway to which a request is to be directed in order to reach a desired destination is determined. Further, the information is indicative of information provided by the gateway for use in authentication of the gateway. This information, as described below, is used to prevent spoofing—pretending to be a particular gateway in order to capture secure information.

Typically, a remote workstation is set up to communicate with a single gateway. A user of the workstation accesses resources available via that one gateway. When access to a resource that is not available through the gateway is desired, the user contacts a system administrator to determine information in the form of a gateway address and so forth for a gateway through which to access the desired resource. Then the user changes their settings to access that gateway and gains access to the resource. Once the resource is no longer needed, the user resets the settings—changes the destination gateway back to the original destination gateway—and continues using the network as before. Such a system is difficult to use and, because system administrators are not always available to answer questions, inconvenient. Often, a user requires training or detailed instructions to access different resources. The result is often that the different resources are not used or that users become frustrated with the network.

In accordance with the invention, a static network map is maintained. The static map comprises information relating to static nodes within the network. The information generally includes gateways and resources accessible through them. The use of a map of static nodes such as the static map is advantageous. An obvious advantage to the use of static maps is a presence of routing information on a workstation. The routing information allows for automated routing of data to a resource transparent to a user of the workstation. Further, selection of a resource from a list of resources is possible. Thus, a user can select a resource and send data thereto without ever understanding which gateway is accessed or what addresses and security were required.

Since the static map information is stored at each of several remote workstations, it is optionally secured. Of course, network topology is often not confidential and, therefore, the static map information is often unsecured. Optionally, the static map is updated unbeknownst to a user of the workstation. This allows substantial alterations to a physical private network without substantially affecting a user's access thereto. Alternatively, the static map is updated by a user of a workstation.

Preferably, security information is stored within the static map. The security information reduces a likelihood of spoofing. Spoofing occurs when a system in communication with a wide area network such as the Internet pretends to be a network gateway. When a connection is formed with that system, all information sent to the "gateway" becomes accessible to that system. In order to prevent spoofing, a static map preferably contains security information. Security information includes information for verifying a gateway connection.

For example, an identifier is provided associated with each gateway. When a communication is initiated with the gateway, certified data is provided from the gateway to the workstation. The identifier is included within the information or, alternatively, is indicative of the authenticity of the certificate. Once the certificate is received, the workstation verifies the authenticity of the certificate/identifier in order to ensure that the connection is with the true gateway. Thus, spoofing is prevented. Evidently, absent a static map, prevention of spoofing adds further information for a user to enter in order to access a different gateway.

Should gateway security be breached, the gateway identifier is changed and the static map is updated. By notifying remote users that a new static map exists, network security is ensured. Users follow directions to load the new static map and then all connections to the network are again secure and verified. Since the static map is generated at the physical network, copying of the static map to a correct location on a workstation is all that is required in order to update it. A utility to automate this task is easily implemented. Of course, the static map can be generated in any of a number of ways and at any of a number of locations including remote locations. It is preferred that it is generated automatically. This is possible by automatically querying all gateways in the SVPN for their configuration and generating a snapshot in the form of the static map file of all gateways.

The static map also comprises connection related information. For example, if a gateway supports tunneling, this may be stored within the static map. If a gateway supports a particular form of encryption or data integrity checking, this may also be stored in the static map.

Thus, the use of static maps greatly enhances network flexibility. New sections of network are more easily accessible as are network resources in general. Alterations to security are easily implemented, changes to gateway information is easily implemented, and so forth. The static map forms an easily distributable routing and security information map for a virtual private network. Of course, the use of static maps for improved routing is also possible.

In an embodiment, a static map is created of network resources. The static map contains a list of resources and for each resource an associated gateway, an associated method of communication such as tunneling, and a distinguishing name. The static map is stored on a workstation. The distinguishing name is indicative of information provided to the workstation system to authenticate the gateway. In this way, the gateway is authenticated by the workstation and the workstation is authenticated by the gateway to ensure that both nodes are the correct network nodes.

Upon issuing a request, a requesting system searches the static map to determine a destination gateway. Communication therewith is initiated via the associated communication method and information is received from the gateway. When the information is as indicated by the static map and is authenticated, the communication of the request proceeds. When the authentication fails, the security of the communication is questionable.

Figure 2:
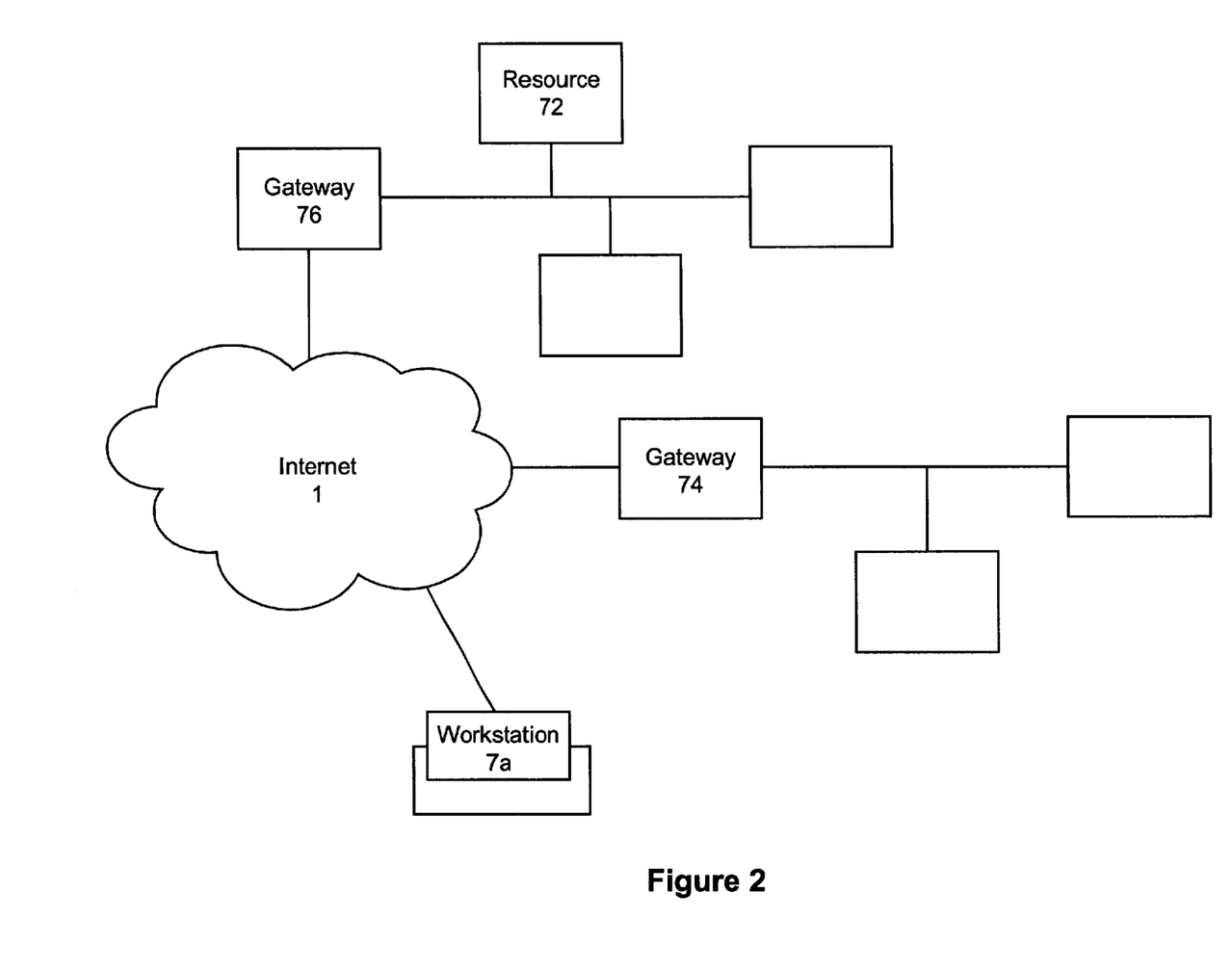
FIG. 2 is a simplified flow diagram of a method of tunneling from a secured workstation through an unsecured communication channel to another secured workstation.

Referring to FIG. 2, another embodiment of the invention is shown. When a request is for transmission from gateway 74 to resource 72, the static map indicates for resource 72 that gateway 74 should transmit the message using tunneling to gateway 76. Gateway 74 and gateway 76 initiate communication and authenticate each other. The message is then secured through encryption and transmitted to the gateway 76 via the Internet 1. At the gateway 76, the message is decrypted and transmitted over the network. In this fashion, a static map presents a point to point map of communication over an unsecured medium. All resources behind gateway 76 are listed in the static map as requiring a transmission to gateway 76 using tunneling and so forth. The complexity of the network beyond gateway 76 is of little concern to the sub-network connected via gateway 74.

In another embodiment in order to maintain a complex virtual network comprising a plurality of sub-networks, information relating to each sub-network is required. The information is then used to route information efficiently throughout the virtual network and to locate resources. In an embodiment of the invention, a data file is created for storing a "current" state of a network. The file is updated on a regular basis and contains information relating to static resources connected to the virtual network. 1The file comprises a static map of the network. The use of such a static map significantly improves performance over polling of resources or transmission of multiple requests by improving communication efficiency and response times. When a change in resources or active workstations is noted within a sub-net, a new static map for that sub-net is stored and is then transmitted for storage in the file. Changes are reflected by new configurations on the VPN gateway. Alternatively, an administrator updates the static map at intervals or upon a change to the network.

Figure 3:
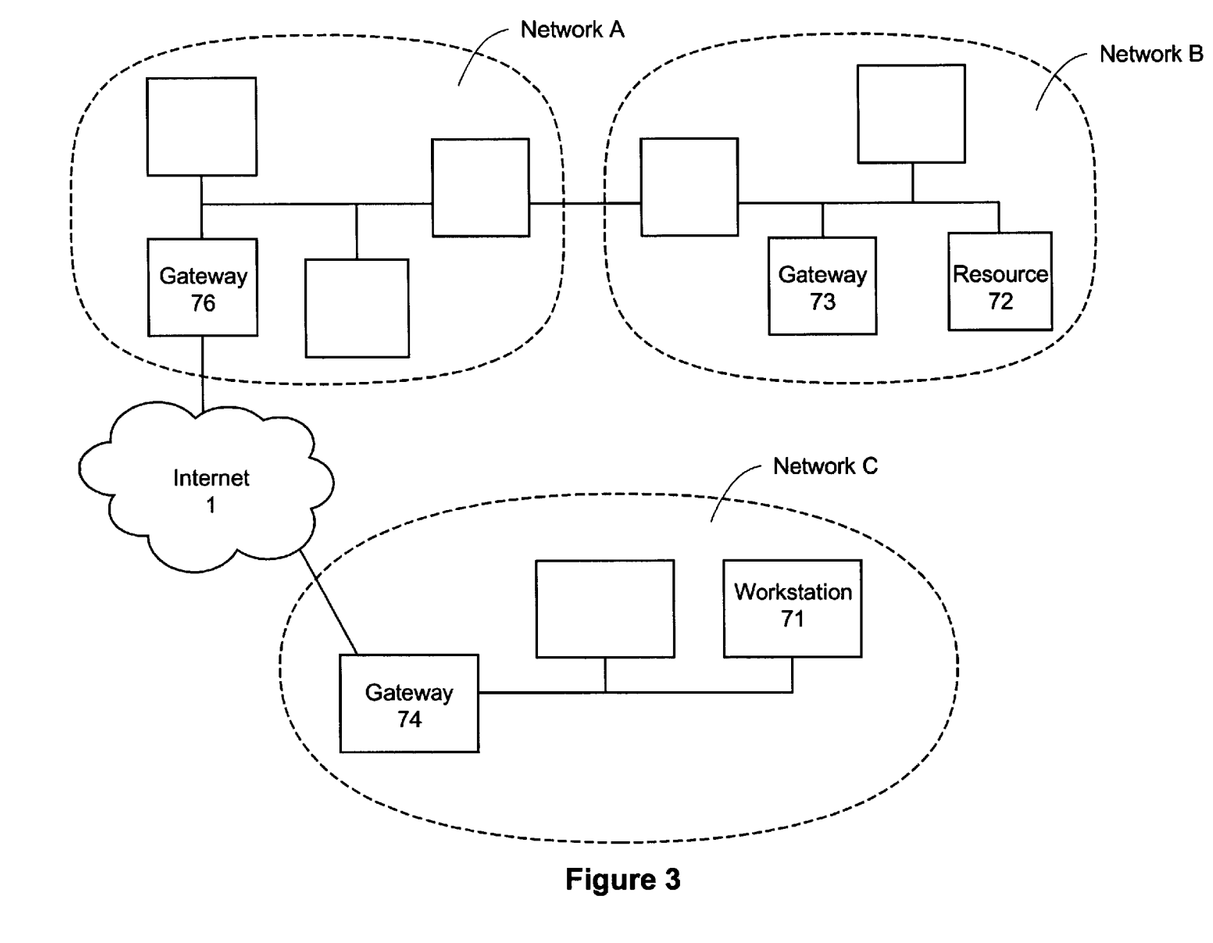
FIG. 3 is a schematic diagram of a network comprising three sub-networks and an unsecured communication medium between two of the sub-networks.

Referring to FIG. 3, an SVPN is shown comprising three separate corporate networks A, B, and C. When a request from workstation 71 in network C is intended for resource 72 in Network B, a common approach to fulfilling this request is to disconnect from network A and connect via the Internet 1 to network B; however, a static map of the network indicates that resource 72 is available in the current network configuration by transmitting a request to network A. From network A the request is transmitted to network B and therein resource 72 is located. Should network B be provided with a gateway (shown as 73) to the Internet 1, an alternative route exists for the request. The use of static maps allows the system to determine a variety of routing choices to take in the event of network failure at a gateway or at another network node. Also, static maps permit selection of a most secure path for routing a request to a resource. These and other advantages are significant over the prior art.

Security of management systems is essential to maintain network security and flexibility of management systems provides enhanced usability and improved turn-around times for problem correction. Often, increased flexibility results in decreased security. Alternatively, increased flexibility results in reduced performance and increased resource utilisation.

Connection security policies in an SVPN are based on a node pair forming a connection. This requires a significant allocation of resources because as the number of potential nodes increases, the number of connection security policies in the most general case is $n^2-n$. For ten possible node connections, this results in 90 security level settings for each possible source/destination node pair. When 100 possible node connections exist, this number jumps to 9900. It is preferable to reduce the number of security level settings in order to facilitate network management, reduce memory requirements, and enhance usability of an SVPN. IN an embodiment of the invention, a method of determining a security policy based on a particular host and a flexible security system for providing a negotiation between nodes via the host to determine desired connection security policies is implemented. A host is provided with a security level and a plurality of policies for enforcing the security level. Each node seeking to connect to another node via the host provides a certificate, which is authenticated, and the node is authorized. The nodes then "negotiate" a security level through implementation of the host security level and policies. For example, ISAKMP is flexible enough to permit negotiation of security levels and is used for this purpose. The host based security levels are less flexible than connection based security levels, but host based security levels are easier to administer.

A common concern in network security applications is physical intrusion. A person gaining physical access to a network cable or to a gateway circuit board has access to significant amounts of information. Within the network cable, information is encoded to prevent access. Within each computer, the authorized user can view information only for that workstation. Commonly in the gateway, a significant amount of unsecured data exists. Opening a gateway and physically probing electrical connections provides access to data transmitted across each connection. According to the invention, all sensitive keying data stored within a gateway system is encrypted with a special Master Key. Therefore, only data in transit is discernable when a gateway system is breached unless the master encryption key is found. The master key is cleared when the gateway system case is compromised. This secures data from physical access attempts.

Another common problem encountered in the use of SVPN systems is that of security concerns for mobile users. For example, when using a cellular modem, an individual may desire increased security. When dialing up an ISP that is identical to that used by the company, performance may be the most significant concern. When using a slow system, performance is critical. When using a very fast state-of-the-art system security is more important. According to an embodiment of the invention, a profile is created containing data relating to a security level, a network adapter, tunneling information, and so forth. When accessing the SVPN, a profile is selected and those settings are used. Optionally, profile authentication occurs to ensure that a desired level of security is achieved for the SVPN and that network security is not compromised. The profile is evaluated in dependence upon a series of criteria including communication medium, location of the mobile user, identity of the mobile user, and desired level of security for the profile. In another embodiment, a profile is flexible. For example, a country of origin of a communication, the communication medium, and an identity of the mobile user is determined and an appropriate set of policies are used.

Figure 4:
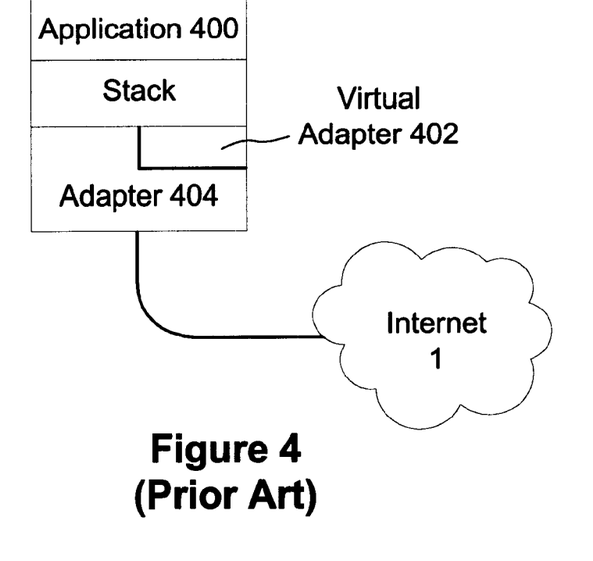
FIG. 4 is a simplified block diagram of a prior art communication system.

Referring to FIG. 4 a simplified block diagram of a portion of a wide area network is shown. An application is executed on a computer. Computer software applications are well known and serve many varied functions. An example of such an application is an email application.

When the application 400 has data for transmission via the wide area network to another workstation or server in communication with the wide area network, the application 400 provides the data to a virtual adapter 402 in execution on the same computer. The virtual adapter 402 processes the data for transmission via the wide area network. For example, protocol related formatting is performed. Optionally, other processing such as compression of data is also performed. The processed data is then provided to the physical adapter 404. Though the following description refers to a virtual adapter 402 for performing these operations, it is also possible to intercept data directed toward the virtual adapter 402, process the intercepted data and redirect it. Thus the virtual adapter 402 does not perform any actual processing of the data, but is used for routing the data; the routing of the data is then used to intercept it.

The adapter comprises a physical and a logical portion. The logical portion includes a device driver and so forth. The adapter is in communication via a communication medium with another system. When the communication medium is a wide area network (WAN) in the form of an Internet network 1, the other computer system is commonly an Internet Service Provider (ISP). Communication media are well known and are not important to the present invention. The adapters communicate according to a common set of rules or protocols. Some common protocols include error detection and correction codes in the form of parity, encryption standards, PPP protocol, and so forth. The physical communication is transparent to the user of an application.

A virtual adapter 402 receiving the data verifies that data transmission is without error. The data is then decoded and provided to a user level on the other system. In this way, a point to point communication is shown.

Figure 5A:
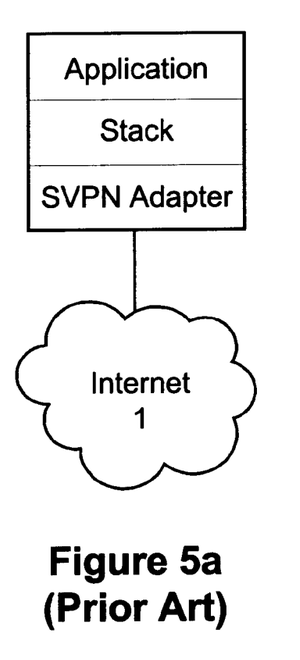
FIG. 5a is simplified block diagram of a prior art communication system for communicating with the Internet.
Figure 5B:
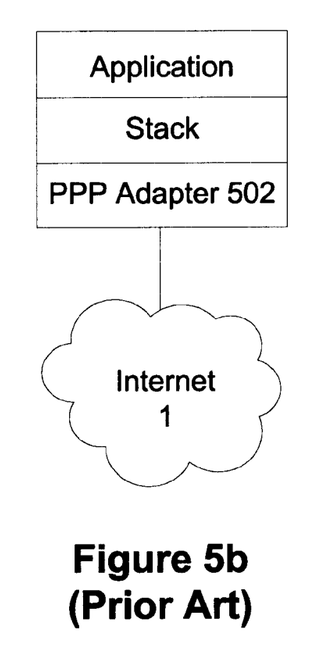
FIG. 5b is simplified block diagram of a prior art communication system for communicating with a private network and thereby forming part of a secure virtual private network.

Referring to FIGS. 5a and 5b simplified block diagrams of prior art implementations of virtual communication adapters are shown. The communication adapters are both for execution a same computer. Because of the way the adapters function, only one adapter is executable at any given time. Thus, a user communicates using a system according to the block diagram of FIG. 5a or FIG. 5b but not both. When communication with a wide area network such as the Internet 1 is performed, the adapter 502 of FIG. 5b is used. A system in execution of such an adapter 502 provides Internet browsing, email, and other Internet access. Security is that provided by the Internet software tools in execution and by the virtual adapter. Many virtual adapters provide no security. When communication with the private network is performed, a secure virtual private network is created. All communicated data is secured prior to transmission to a secure gateway of the private network. There the data is decoded and transmitted to its destination. Such a connection provides access to private network data, applications, and internal mail. It also provides connections to the Internet but only via the gateway. Thus to communicate with the Internet, a data flow diagram such as that shown in FIG. 6 is required.

Figure 6:
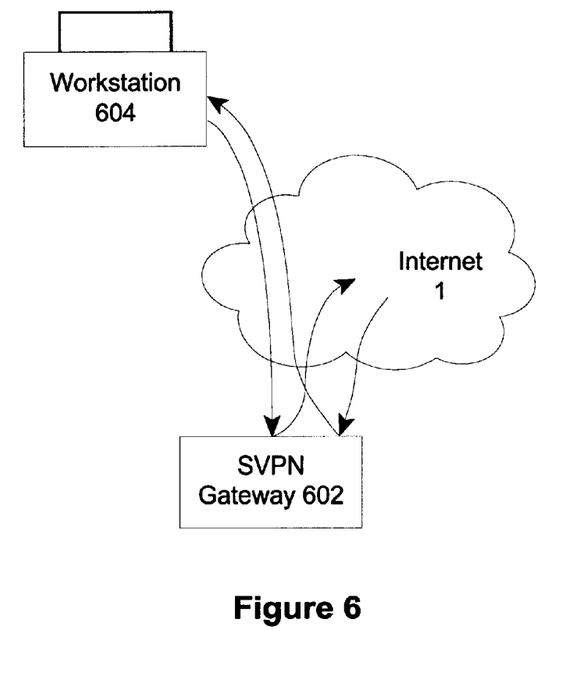
FIG. 6 is a simplified data flow diagram of communication with the Internet from a remote workstation forming part of a secure virtual private network.

Referring to FIG. 6, a very complicated diagram results when an Internet request is transmitted when connected to an SVPN. The request is secured because it isn't distinguished from other SVPN data. It is then transmitted via the WAN to the gateway 602. The gateway 602 decodes the data and then, routes it to its destination. Often, firewalls implement security protocols to prevent security breaches of the private network. When the request and the requested data are not perceived as a security threat, the requested data is received by the gateway 602 and secured for transmission back to the workstation 604. Alternatively, a user of the workstation 604 can disconnect themselves from the SVPN and connect to the WAN with the virtual adapter of FIG. 5b in order to access the Internet.

Another prior art adapter system comprises two adapters in concurrent execution wherein a "virtual" adapter directs data output therefrom back up to a user level of the system. There it is redirected to the adapter through a plurality of system levels. Such a system is inefficient in its use of system resources and since the virtual adapter returns processed data to the user level, not a true implementation of a virtual adapter.

Clearly, none of these solutions is optimal. In one, the gateway must handle all Internet requests twice and the firewall provides security even though the workstation is not within the private network. In another, the user of a workstation must disconnect and reconnect numerous times during the course of a same session at the workstation. In yet another system resources are inefficiently allocated and data integrity is not guaranteed since at a user level within the system, the data is accessible to interception and modification.

Figure 7A:
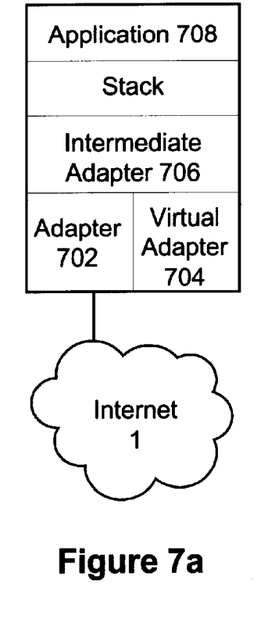
FIGS. 7a and 7b are simplified block diagrams of systems according to the invention for providing communication from a remote workstation forming part of a secure virtual private network with the Internet other than via the secure private network while connected to the secure virtual private network; and, FIGS. 8a and 8b are simplified flow diagrams of the systems of FIGS. 7a and 7b respectively.
Figure 7B:
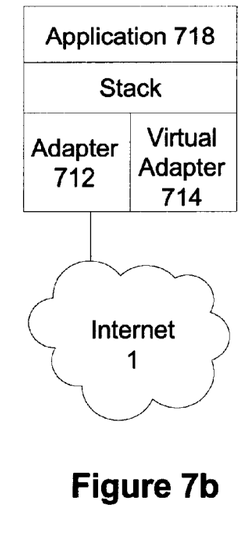

Referring to FIGS. 7a and 7b, block diagrams of systems according to the invention are shown. In FIG. 7a, a system for providing secure remote access via a wide area network to a private network is shown. The system comprises an adapter 702 and a virtual adapter 704 in concurrent execution. The virtual adapter 704 acts as a destination for routing. Data routed to the virtual adapter 704 is intercepted by the intermediate adapter 706 and processed. The data is then rerouted to the adapter 702 for communication via the wide area network.

The adapter 702 in the form of a WAN adapter is for communicating information via the wide area network. This information is typically in the form of Internet requests and responses. Thus, any commonly available Internet software such as world wide web browsers, email software, gopher software, video conferencing software, etc. is useful while connected to the Internet 1.

The virtual adapter 704 in the form of an SVPN virtual adapter is a destination for secured information for transmission via the wide area network to the private network. In essence, the virtual adapter 704 address is used to direct data for similar processing as with a prior art SVPN adapter. The data is processed with a data securer in the form of an encryptor for obfuscating the data. Typically, data is obfuscated through encryption as is commonly known in the art. When a user wishes to transmit information to or receive information from the private network, an application 708 in the form of an internal mail system, a database, or an operating system of the workstation provides data routed to the virtual adapter 704. The data is intercepted and secured and packaged for transmission to a gateway via the wide area network. Once it is secured and packaged, it is provided to the adapter 702 for communicating it to the gateway.

Referring to FIG. 7b, a system for providing secure remote access via a wide area network to a private network is shown. The system comprises a virtual adapter 714 and an adapter 712. The adapters 712 and 714 execute concurrently on the system. According to the embodiment of FIG. 7b, only the adapter in the form of a WAN virtual adapter 714 has associated hardware. The virtual adapter 714 in the form of an SVPN virtual adapter 714 communicates with applications 718 in execution on the system and with the adapter 712.

The adapter 712 is for communicating information for transmission via the wide area network. The information may be secured information received from the virtual adapter 714 or it may be unsecured information received from an application. The virtual adapter 714 is for communicating secured information with the adapter 712 for transmission via the wide area network to the private network. Thus the adapter transmits all information to the network and processes information received for transmission based on the wide area network protocol. The virtual adapter 714 acts as a translator for securing information and for processing the data to ensure data integrity.

Figure 8A:
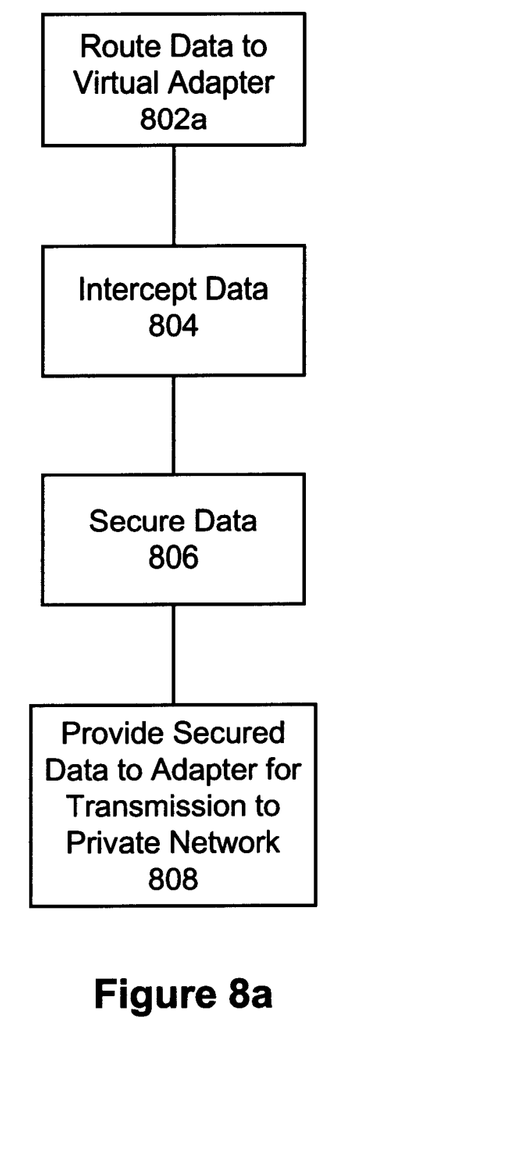
Figure 8B:
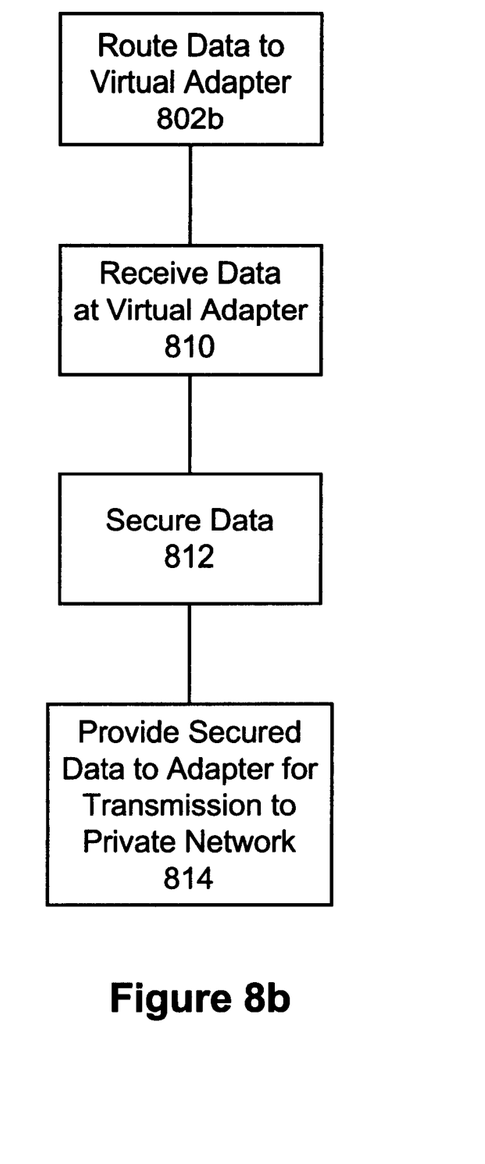

Referring to FIGS. 8a and 8b, simplified flow diagrams of method for each of the systems of FIGS. 7a and 7b are shown.

In FIG. 8a, another method for secure remote access via a wide area network to a private network is shown. Data is provided from an application for communication to another system via a public network in the form of a wide area network. The data is one of data for communication via the secure virtual private network or for communication in an unsecured fashion. When the data is unsecured data, it is provided to an adapter which processes the data and provides it for transmission. Of course, secure data in the form of encrypted messages or files may also be provided to the adapter. The adapter is selected based on a designated destination for the data and not whether or not it is secured. When the data is for transmission in a secure fashion, the data is routed to a virtual adapter shown by step 802a. The data is intercepted, step 804, by a process for securing the data, step 806, and then provided to the adapter, step 808. Optionally further processing occurs such as address translation. When the virtual adapter and the adapter are in concurrent execution on the workstation, Internet access and SVPN access are possible simultaneously without the drawbacks of routing all Internet requests via the SVPN.

In FIG. 8b, a method for secure remote access via a wide area network to a private network is shown. Data is provided from an application for communication to another system via a public network in the form of a wide area network. The data is one of data for communication via the secure virtual private network or for communication in an unsecured fashion. When the data is unsecured data, it is provided to an adapter, which processes the data and provides it for transmission. Of course, secure data in the form of encrypted messages or files may also be provided to the adapter. The adapter is selected based on a designated destination for the data and not whether or not it is secured. When the data is for being transmitted in a secure fashion, the data is provided to a virtual adapter, step 802b, where it is received at step 810 for securing the data, step 812, processing the data, and providing the data to the adapter for communication to a gateway of a secure private network, step 814. When the virtual adapter and the adapter are in concurrent execution on the workstation, Internet access and SVPN access are possible simultaneously without the drawbacks of routing all Internet requests via the SVPN.

Though the method of using static maps according to the invention is described with reference to use on workstations disposed remotely from a gateway, it is also applicable to use by gateways. The gateways use static map data to route data within the secure virtual private network. For example, when a gateway is routing data to a resource within another portion of the secure virtual private network via another different gateway.

Numerous other embodiments may he envisaged without departing from the spirit and scope of the invention.

What is claimed is:

1. A method of transmitting first data within a secure virtual private network comprising the steps of:
   storing static map data, the static map data being indicative of a plurality of static gateways and of resources accessible therethrough, the static map data further comprising security information for use in authenticating each of the plurality of static gateways;
   selecting a resource to which to direct the first data;
   determining from the static map data a gateway of the plurality of static gateways for accessing the selected resource;
   establishing a communication with the determined gateway wherein certification data is obtained from the determined gateway for use in authenticating the determined gateway;
   authenticating the determined gateway based on the certification data and the security information from the static map data for the determined gateway; and,
   transmitting the first data to the determined gateway for provision to the selected resource.

2. The method as defined in claim 1, wherein the step of storing the static map data is performed automatically.

3. The method as defined in claim 1, further comprising the step of updating the stored static map data.

4. The method as defined in claim 3, wherein the security information of the static map data further comprises gateway authentication data.

5. The method as defined in claim 4, wherein the static map data further comprises gateway forwarding data for accessing the plurality of static gateways.

6. The method as defined in claim 5, wherein the static map data further comprises resource forwarding data for accessing the resources accessible through the plurality of static gateways.

7. The method as defined in claim 6, wherein the step of storing the static map data comprises storing the static map data on a workstation remote to the plurality of static gateways for which gateway authentication data and gateway forwarding data is stored within the static map data.

8. The method as defined in claim 7, wherein the static map data further comprises gateway communication data being indicative of a manner of communicating securely with each of the plurality of static gateways.

9. The method as defined in claim 8, wherein the gateway communication data for the plurality of static gateways includes data indicative of whether each of the plurality of static gateways supports tunneling.

10. The method as defined in claim 7, wherein the static map data comprises gateway security and communication data for the plurality of static gateways, the gateway security and communication data being indicative of a security access procedure for accessing the plurality of static gateways securely and a manner of communicating securely with each of the plurality of static gateways and wherein the communication established in the step of establishing the communication with the determined gateway and authenticating the determined gateway is a secure communication and of a type indicated by the gateway security data and gateway communication data and secured in accordance therewith.

11. A method of transmitting first data within a secure virtual private network comprising the steps of:
   storing static map data, the static map data indicative of at least one static gateway, each said static gateway of the at least one static gateway having at least one resource accessible therethrough, the static map data being indicative of every resource accessible through each said static gateway and comprising security information for use in authenticating each said static gateway, the static map data being stored on a workstation remote from each said static gateway;

selecting a destination resource from a set consisting of every resource accessible through each said static gateway, the first data for provisioning to the selected destination resource from the workstation;

selecting from the stored static map data one static gateway of each said static gateway through which to access the selected destination resource;

establishing a communication between the workstation and the selected static gateway and authenticating the selected static gateway; and transmitting the first data to the selected static gateway for provisioning to the selected destination resource.

12. The method as defined in claim 11, wherein the static map data further comprises gateway routing data and gateway authentication data for each said static gateway, and further comprises resource routing data for every said resource accessible through each said static gateway.

13. The method as defined in claim 12, wherein the step of storing the static map data is performed automatically.

14. The method as defined in claim 12, wherein the static map data further comprises gateway communication data being indicative of a manner of communicating securely with each said static gateway.

15. The method as defined in claim 12, wherein the static map data comprises gateway security data being indicative of a security access procedure for accessing each said static gateway securely.

16. The method as defined in claim 12, wherein the static map data further comprises gateway security data and gateway communication data, the gateway security data being indicative of a security access procedure for accessing each said static gateway securely, the gateway communication data being indicative of a manner of communicating securely with each said static gateway and wherein the communication established in the step of establishing the communication between the workstation and the selected static gateway and authenticating the selected static gateway is a secure communication and of a type indicated by the gateway security data and gateway communication data and secured in accordance therewith.

17. A method of routing first data within a secure virtual private network comprising the steps of:

storing a static map, the static map comprising gateway data related to at least one gateway and resource data related to at least one resource, the gateway data including gateway routing data, gateway connection data, gateway security data, and gateway authentication data, the resource data including resource routing data, each said resource having a related gateway of the at least one gateway through which the resource is accessible;

storing the static map on a workstation remote to each said gateway for which gateway data is stored in the static map;

selecting one of a destination gateway of the at least one gateway and a destination resource of the at least one resource to which to direct the first data;

if said step of selecting one of the destination gateway and the destination resource selects the destination resource, determining from the static map data the gateway data for the related gateway to the destination resource, the related gateway constituting a routing gateway;

if said step of selecting one of the destination gateway and the destination resource selects the destination gateway, determining from the static map data the gateway data for said destination gateway, the destination gateway constituting a routing gateway;

establishing a secure communication with the routing gateway using the gateway routing data and the gateway communication data for the routing gateway, receiving certification data from the routing gateway and authenticating the routing gateway with which the communication is established using the gateway data for the routing gateway; and, transmitting the first data to the routing gateway and, if said step of selecting one of the destination gateway and the destination resource selects the destination resource, routing the first data to the destination resource using the resource routing data.

18. The method as defined in claim 17, wherein the step of storing the static map data is performed automatically.

19. A method of transmitting message data within a network architecture that comprises an originating terminal from which to transmit said message data, a destination network and an intermediate network operatively connected therebetween, the destination network comprising at least one of a plurality of gateways for interfacing with the intermediate network, each said gateway of the destination network corresponding to at least one of a plurality of resources of the destination network accessible therethrough, the method comprising the steps of:

(a) storing static map data, the static map data being indicative of each said gateway of the destination network and of each said resource of the destination network accessible therethrough, the static map data further comprising security information for authenticating each said gateway of the destination network;

(b) selecting a resource of the destination network to which to transmit said message data from the originating terminal;

(c) selecting from the static map data a gateway of each said gateway of the destination network, wherein the selected resource is accessible from the selected gateway;

(d) establishing a communication with the selected gateway, wherein certification data is obtained from the selected gateway for use in authenticating same;

(e) authenticating the selected gateway based on the certification data so obtained and on the security information stored in the static map;

(f) transmitting said message data from the originating terminal to the selected gateway for provision to the selected resource.

20. The method as defined in claim 19, wherein said step (a) is performed automatically.

21. The method as defined in claim 20, wherein said step (a) comprises storing the static map data on a terminal remote to each said gateway of the destination network.

22. The method as defined in claim 21, wherein the static map data further comprises gateway communication data being indicative of a manner of communicating securely with each said gateway.

23. The method as defined in claim 22, wherein the gateway communication data for each said gateway includes data indicative of whether each said gateway supports tunneling.

24. The method as defined in claim 21, wherein the static map data comprises gateway security and communication data for each said gateway, the gateway security and communication data being indicative of a security access procedure for accessing each said gateway securely and a manner of communicating securely with each said gateway and wherein the communication established in said step (d) is a secure communication and of a type indicated by the gateway security data and gateway communication data and secured in accordance therewith.

25. The method as defined in claim 19, wherein the originating terminal is part of an originating network.

* * * * *